Patented Sept. 19, 1939

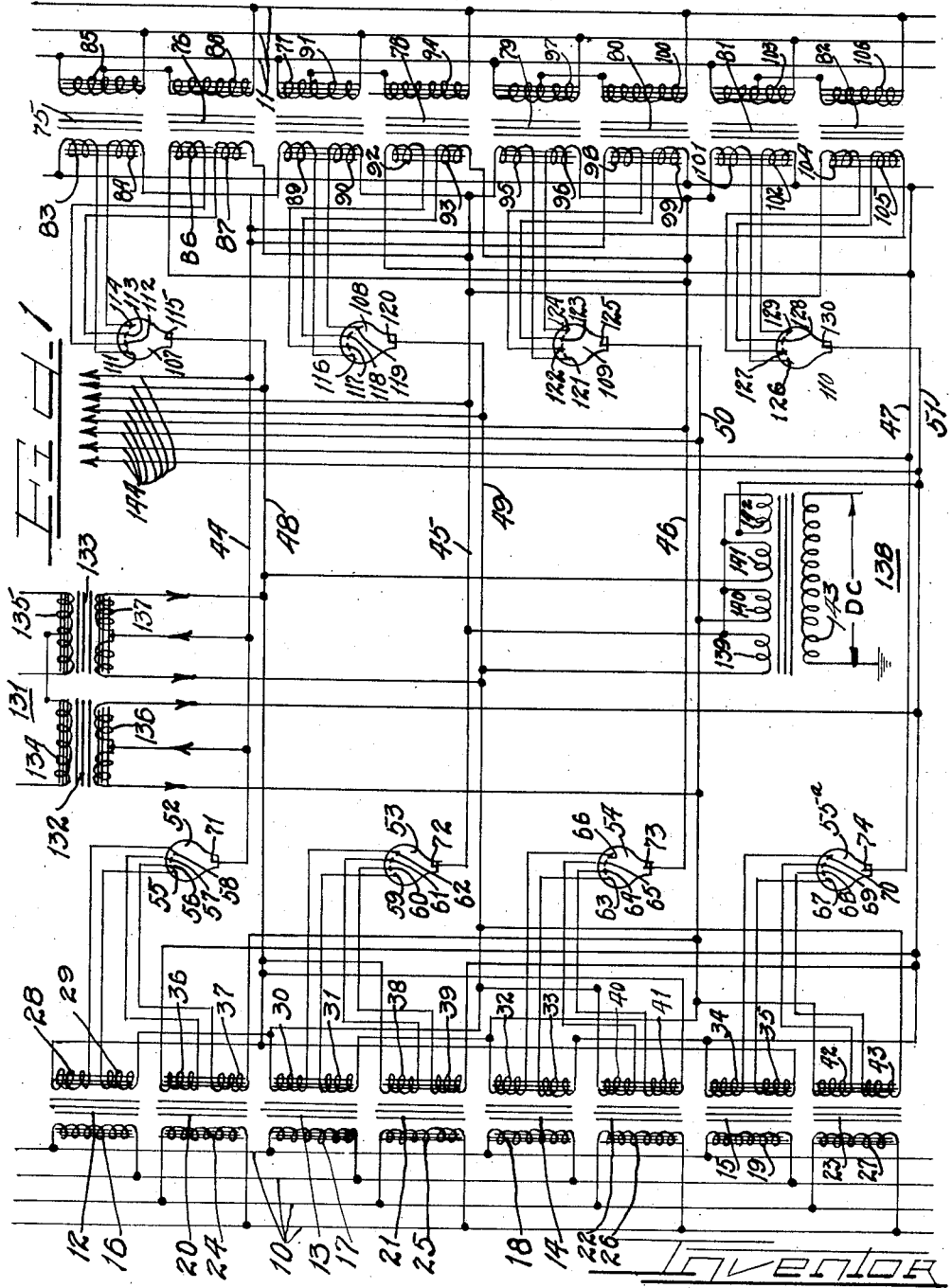

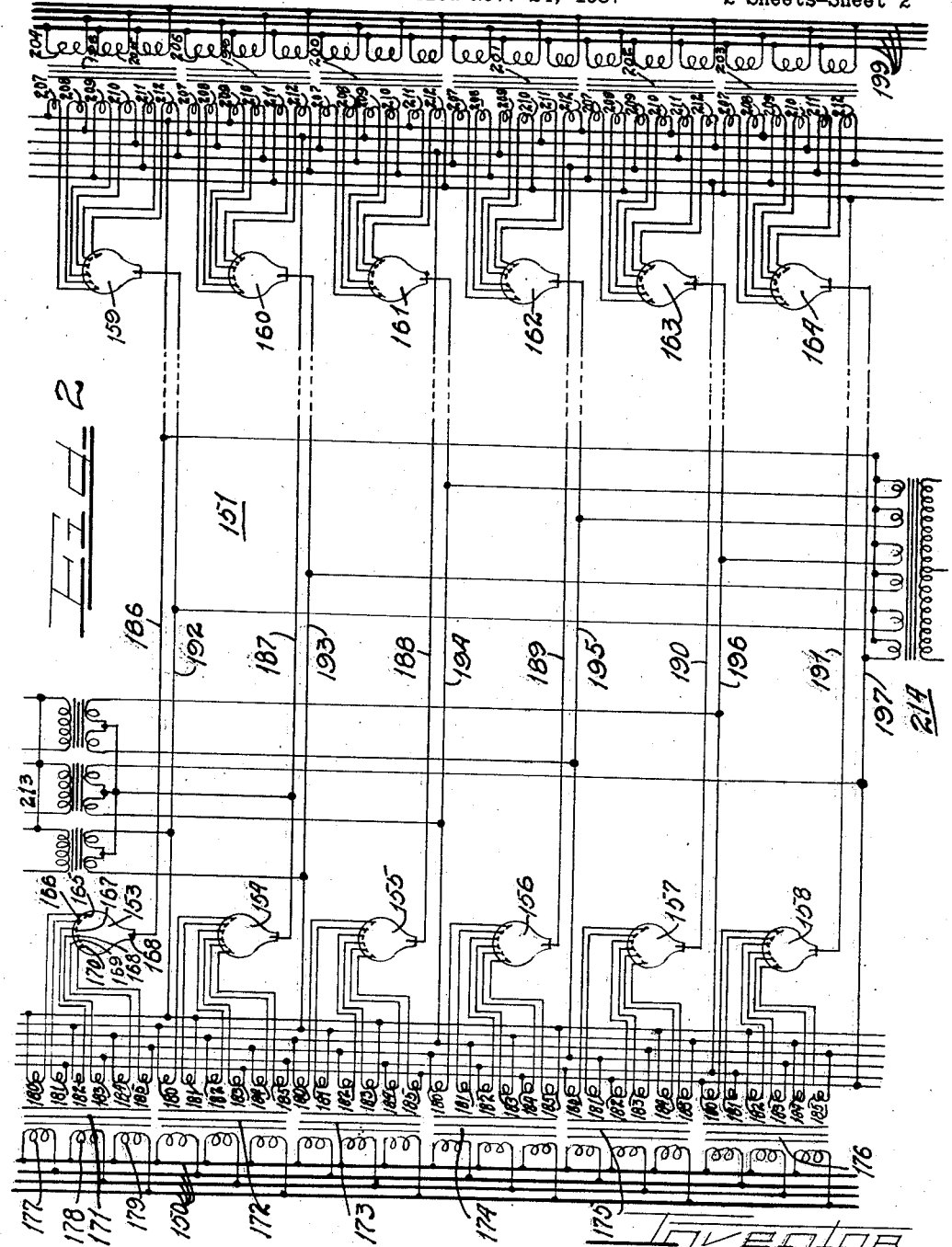

2,173,121

UNITED STATES PATENT OFFICE 2,173,121

ELECTRIC POWER TRANSMISSION AND DISTRIBUTION SYSTEM

Albert R. Locke, Oak Park, Ill.

Application November 24, 1937, Serial No. 176,230

14 Claims. (Cl. 171—97)

This invention relates to an electric power transmission and distribution system, and more particularly to a system in which electric energy is transmitted in the form of uni-directional current.

Large quantities of electric power are now almost universally transmitted over transmission lines as high tension, alternating current. As the demand for electric power has increased and as the distance from the generating center over which the power must be transmitted is increased, there has been a constant tendency to increase the voltage of transmission in order to minimize losses, and particularly the $I^2R$ losses. Increasing the tension or voltage of an alternating current transmission line, however, introduces serious difficulties which restrict the distance to which alternating current power can be transmitted economically. It has been found that the charging current for instance, becomes very great when the load at the remote end of the transmission line has been disconnected. Indeed, this loss by charging current is sometimes as great as the load current itself. The insulation of the high tension line becomes a difficult problem and the insulators are subject to failure due to losses therein caused by alternating electric stresses to which they are subjected. Corona is another serious trouble since corona depends upon the peak voltage and not upon the mean effective voltage. As a remedy for these and other troubles, it has been proposed to generate alternating current at high tension and to convert the alternating current into direct current and transmit the direct current at high tension over the high tension line, and use it at the consuming end either as direct current at high tension or to convert it into alternating or direct current at low tension and employ it as such.

In the past, it has generally been considered by power plant engineers that it is necessary to transmit a uni-directional current which approaches the uniformity of a direct current generated. That is to say, it was generally considered to be desirable to eliminate as far as possible any ripple or pulsation in the uni-directional current. To this end, the alternating current from which the uni-directional current is derived has been supplied in a large number of phases, which in some instances have even been as high as forty or fifty phases.

While the transmission of high tension uni-directional current in this manner eliminates many of the troubles present with high tension alternating current transmission, it introduces certain other difficulties and has many disadvantageous features. It is of course well known that with high tension alternating current transmission, it is possible to take small amounts of power at high tension from the high tension line to operate switching or auxiliary apparatus of the high tension line, or for branch lines connected therewith, and to supply energy for measuring devices for ammeters and voltmeters that indicate the condition of the high tension line. It is also possible with the transmission of power by high tension alternating current to tap the transmission line and obtain small amounts of power for lighting purposes, such for example, as street lights for small communities through which the transmission line passes. On the other hand, when high tension uni-directional current, which is substantially free from pulsation or ripple is employed, it is impractical and inadvisable to draw small amounts of power from the transmission line since there is no convenient means for reducing the potential of the line.

Under the existing high tension alternating current transmission system, it is also common practice for several high tension lines to deliver power into a common low tension alternating current network, wherein the frequency of the network is controlled by one or more of the generating stations feeding the high tension line. This cannot be done with high tension direct current transmission of the type referred to above, since the frequency of the high tension alternating current at the generating station cannot control the frequency of the low tension alternating current power consuming network over the direct current transmission line.

It is an object of this invention to provide an electric power transmission and distribution system wherein the advantages of transmitting power by direct current are realized and wherein many of the disadvantages such as those enumerated above, are obviated.

In accordance with this invention, polyphase alternating current is passed through a plurality of voltage step-up transformers, and polyphase pulsating uni-directional current is derived therefrom by means of a plurality of suitable rectifying devices. Each rectifying device is connected to a conducting path of a multi-conductor transmission line, there being a plurality of outgoing conducting paths over which the pulsating uni-directional current passes in one direction and a corresponding plurality of return conducting paths over which the pulsating uni-directional current passes in the opposite direction.

Thus, each out-going conducting path of the transmission line has impressed thereon a series of uni-directional pulsations, such for example, as a series of rectified half-waves of different phase sequence. The half-waves or uni-directional pulsation of different phase on each outgoing conducting path of the transmission line are selectively segregaated at the end of the transmission line and return over different return conductor paths. This process of selective segregation is such that if a load were connected between any one out-going path and any one returning path, only a half-wave or uni-directional pulsation of a single phase would be obtained. By virtue of this selective segregation of the uni-directional pulsations of different phase, it is possible to obtain either alternating or pulsating uni-directional current from the transmission line through step-down transformers. The alternating current derived from the transmission line may be of the same phase as that at the power source or it may be any other phase, as desired.

In accordance with this invention, means is also provided which permits a plurality of power sources to feed into a common distribution network.

It is thus an object of this invention to provide a novel transmission and distribution system having the above characteristics.

It is a further object of this invention to provide a novel transmission system and novel means for transmitting and receiving power which employs polyphase pulsating unidirectional current.

Another object of this invention is to provide a novel method and means of transmitting electric energy by means of uni-directional current, which is economical and which is rugged and reliable in use.

Another and further object of this invention is to provide a novel high tension uni-directional transmission system from which a low voltage alternating current may be obtained.

Another and still further object of this invention is to provide a novel method and means for deriving alternating current from a high tension uni-directional transmission transmission system.

The novel feature which I believe to be characteristic of my invention are set forth with particularity in the appended claims. My invention itself, however, both as to its organization, manner of construction, and methods of operation, together with further objects and advantages thereof, may best be understood by reference to the following description taken in connection with the accompanying drawings in which:

Figure 1 illustrates schematically a high tension uni-directional current transmission and distribution system wherein the source of power is two phase alternating current and wherein the main load or distribution system is three phase alternating current; and Figure 2 is a schematic view illustrating a high tension uni-directional current transmission and distribution system, wherein the source of power is three phase alternating current and wherein the main load or distribution network is also a three phase alternating current network.

In the power transmission and distribution system illustrated in Figure 1, the source of electric power is illustrated as being a four wire, two phase alternating current line 10, and the main distribution network 11 is illustrated as a three wire, three phase distribution network. The voltage of the two phase alternating current source is raised through a plurality of transformers 12, 13, 14 and 15 having their respective primary windings 16, 17, 18 and 19 connected to one phase of line 10, and a plurality of transformers 20, 21, 22 and 23 having their primary windings 24, 25, 26 and 27 respectively connected to the other phase of line 10. Transformers 12 to 15 and 20 to 23 are of the usual iron core type commonly employed in power distribution systems. Each of transformers 12 to 15 and 20 to 23 are provided with a pair of secondary windings 28 to 43 respectively which are connected to the transmission system in a novel manner presently to be described.

The transmission line which is to carry the power of the transmission and distribution system of Figure 1 includes four out-going conducting paths 44, 45, 46 and 47 and four return conducting paths 48, 49, 50 and 51. In other words, conductors 44 to 47 are designed to carry uni-directional current in one direction while conductors 48 to 51 are designed to carry uni-directional current in the opposite direction. It will, of course, be understood that the eight conductors 44 to 51 inclusive provide the transmission line by which high tension uni-directional current is transmitted over a relatively great distance.

In order to obtain high tension uni-directional voltage for transmission over the transmission line, a plurality of rectifying devices 52, 53, 54 and 55 are provided each having four anodes 55—56—57—58, 59—60—61—62, 63—64—65—66, and 67—68—69—70, and each having a single cathode 71, 72, 73, and 74 respectively. The lower ends of windings 28, 36, 30, 38, 32, 40, 34 and 42 are connected to anodes 58, 57, 62, 61, 66, 65, 70 and 69 respectively of the rectifying devices. The upper ends of winding 29, 37, 31, 39, 33, 41, 35 and 43 are connected to anodes 56, 55, 60, 59, 64, 63, 68 and 67 respectively of the rectifying devices. Cathodes 71, 72, 73 and 74 are connected to conductors 44, 45, 46 and 47 respectively. Return conductor 48 is connected to the upper end of winding 28, the upper end of winding 38, the lower end of winding 41, and the lower end of winding 35. Return conductor 49 is connected to the upper end of winding 30, the upper end of winding 40, the lower end of winding 29, and the lower end of winding 43. Return conductor 50 is connected to the upper end of winding 32, the upper end of winding 42, the lower end of winding 37 and the lower end of winding 31. Return conductor 51 is connected to the upper end of winding 36, the upper end of winding 34, the lower end of winding 39, and the lower end of winding 33.

The transmission line comprising conductors 44 to 51 terminates in a plurality of transformers 75 to 82 inclusive. Transformer 75 has two primary windings 83 and 84 and a secondary winding 85. Similarly, transformer 76 is provided with two primary windings 86 and 87 and a secondary winding 88; transformer 77 is provided with two primary windings 89 and 90 and a secondary winding 91; transformer 78 is provided with two primary windings 92 and 93 and a secondary winding 94; transformer 79 is provided with two primary windings 95 and 96, and a secondary winding 97; transformer 80 is provided with two primary windings 98 and 99 and a secondary winding 100; transformer 81 is provided with two primary windings 101 and 102, and a secondary winding 103; and transformer 82 is provided with two primary windings 104 and 105 and a secondary winding 106.

For a reason which will presently appear, a similar number of rectifying devices 107, 108, 109, and 110 are provided at the terminating end of the transmission line. Rectifying devices 107 to 110 and rectifying devices 52 to 55 are preferably of the mercury vapor electron discharge type and more commonly known to the trade as "mercury vapor tub rectifier". Rectifier 107 is provided with four anodes 111, 112, 113 and 114 and one cathode 115. Rectifier 108 is provided with four anodes 116, 117, 118 and 119 and one cathode 120. Rectifier 109 is provided with four anodes 121, 122, 123 and 124 and one cathode 125. Rectifier 110 is provided with four anodes 126, 127, 128 and 129 and one cathode 130. Anodes 111 and 112 are connected to the lower ends of windings 83 and 86 respectively, while anodes 113 and 114 are connected to the upper ends of windings 87 and 84 respectively. Anodes 116 and 117 are connected to the lower ends of windings 89 and 92 respectively, while anodes 118 and 119 are connected to the upper ends of windings 93 and 90 respectively. Anodes 121 and 122 are connected to the lower ends of windings 95 and 98 respectively, while anodes 123 and 124 are connected to the upper ends of windings 99 and 96 respectively. Anodes 126 and 127 are connected to the lower ends of windings 101 and 104 respectively, while anodes 128 and 129 are connected to the upper ends of windings 104 and 101 respectively. Conductors 48, 49, 50 and 51 are connected directly to cathodes 115, 120, 125 and 130 respectively.

As shown in the drawings, secondaries 85, 88, 91, 94, 97, 100, 103 and 106 are connected to the distribution line or network 7 in such a way as to supply three phase alternating current thereto.

From a close inspection of Figure 1 of the drawings, it will be found that the secondaries of the transformers which are connected to the source 10, are connected to the rectifiers 71, 72, 73 and 74 in such a manner that full wave rectification of the two phase alternating current supply is obtained. This is by virtue of the fact that two of the anodes of each rectifier are connected to a transformer which is connected across one phase of the source, while the other two anodes of the rectifier are connected to a transformer which is connected across the other phase of the source. The double secondary windings of each transformer are connected to the rectifiers in the manner shown to permit full wave rectification; that is to say, the negative half of each alternating current wave is inverted to obtain a double positive half wave from the full alternating current wave. Thus it will be understood that four separate wave trains are travelling out over each out-going conductor in different phase sequence with respect to each other. In other words, on each out-going conductor 44, 45, 46 and 47 of the transmission line there is the positive half wave and the inverted negative half wave of one phase and the positive half wave and the inverted negative half wave of the other phase. The result is that there are four sets of half waves or unidirectional pulsations of different phase or time sequence on each out-going conductor 44, 45, 46 and 47.

These four series of uni-directional pulsation of different time sequence are selectively segregated at the terminating end of the transmission line, and return over different return conductors to complete the circuit. Thus the half wave or uni-directional pulsation derived from secondary winding 28 and anode 58 passes through primary winding 84, return conductor 48 and then back to the opposite end of winding 28. The half wave or uni-directional pulsation derived from winding 29 which is the inverted complement of the wave derived from winding 28 passes over out-going conductor 44, winding 89, and back over return conductor 49 to the opposite end of winding 29. The half wave derived from winding 36 passes out over out-going conductor 44 through primary winding 105 back over return conductor 51 to the opposite end of winding 36. The half wave or uni-directional pulsation derived from secondary winding 37 passes out over out-going conductor 44 through primary winding 98 and back over return conductor 50 to the opposite end of control winding 37, thus completing the circuit. We thus see that while a portion of each of the closed circuits over which the uni-directional pulsation of different phase sequence are passed from rectifier 71, another portion is separate and distinct for each different train of uni-directional pulsations of different phase sequence.

In a similar manner the closed path over which the uni-directional pulsation derived from secondary winding 34 passes includes out-going conductor 45, primary winding 90 and return conductor 49. The closed circuit of secondary winding 31 includes out-going conductor 45, primary winding 95 and return conductor 50. The closed circuit of winding 38 includes out-going conductor 45, primary winding 87 and return conductor 49. The closed circuit of secondary winding 39 includes out-going conductor 45, primary winding 104 and return conductor 51.

The closed circuit over which the uni-directional pulsation derived from the secondary winding 32 passes, includes out-going conductor 46, primary winding 96 and return conductor 50. The closed circuit of secondary winding 33 includes out-going conductor 46, primary winding 101 and return conductor 51. The closed circuit of secondary winding 40 includes out-going conductor 46, primary winding 93 and return conductor 49. The closed circuit of secondary winding 41 includes out-going conductor 46, primary winding 86 and return conductor 48.

The closed circuit over which the uni-directional pulsation passes, which is derived from winding 34, includes out-going conductor 47, primary winding 102 and return conductor 51. The closed circuit of secondary winding 35 includes out-going conductor 47, primary winding 103 and return conductor 48. The closed circuit of secondary winding 42 includes out-going conductor 47, primary winding 99 and return conductor 50. The closed circuit of secondary winding 43 includes out-going conductor 47, primary winding 92 and return conductor 49.

From the above description of the various closed circuits over which the uni-directional pulsations of different phase sequence pass, it will readily be appreciated that while every out-going and return conductor contain four sets of uni-directional pulsation of different phase, any one out-going conductor and any one return conductor only defines a closed path for a uni-directional train of pulsations of one phase. It is entirely by virtue of this selective segregation of uni-directional pulsation of different phase, that the beneficial results of this invention are obtained. Thus any particular wave train or series of uni-directional pulsations may be obtained by properly selecting an out-going conductor and a return conductor, and this wave train or series of uni-directional pulsation may be caused to pass through a winding of a transformer in any desired direction. By combining one series of uni-directional pulsations of one phase with a different series of uni-directional pulsations of a different phase in two windings of a transformer either alternating current or uni-directional current may be obtained from the secondary of the transformer depending upon the direction that the uni-directional pulsations are passed through the primary windings of the transformer. Due to the fact that there are a plurality of trains of uni-directional pulsation passing over the transmission line, it will also be apparent that polyphase alternating current may be obtained through suitable step-down transformers.

For the same reasons as pointed out above, it is possible to provide either an alternating current or a uni-directional step-down tap-off of the main transmission line anywhere along its length. Thus, at 131 I have illustrated a three phase take-off from the main transmission line. For this purpose two transformers 132 and 133 are employed having secondary windings 134 and 135 respectively and primary windings 136 and 137 respectively which are tapped at their midpoint. The left hand side of primary winding 136 is energized by uni-directional pulsations of one phase which are obtained by tapping out-going conductor 44 and return conductor 50. The inverted half cycle complement, of the uni-directional pulsations threading the left side of winding 132, is caused to pass through the right side of winding 132 by tapping out-going conductor 44 and return conductor 51 as shown in the drawings. Since the uni-directional pulsations pass from right to left in the left side of winding 136 and from left to right in the right side of winding 136, it is clear that a single phase alternating current is obtained in the secondary winding 134 of transformer 132. Similarly a uni-directional pulsation of one phase and the inverted half cycle complement thereof, are caused to pass through winding 137 by tapping out-going conductor 34 and connecting it to the midpoint of winding 137 and connecting the opposite ends of winding 137 to return conductors 51 and 48. Since all four of the return conductors which have been tapped by the opposite ends of windings 136 and 137 are different, it is clear that the single phase alternating current obtained in the secondary winding 135 of transformer 132, is 90° out of phase with respect to the single phase alternating current obtained in winding 134 of transformer 132. By connecting the right end of winding 134 and the midpoint of winding 135, three phase alternating current is obtained on the three conductors leading from the left side of winding 134, the left side of winding 135 and the right side of winding 135.

A direct current or uni-directional step-down tap-off from the main transmission line is indicated generally at 138. This tap-off is obtained by employing an ordinary iron core transformer having four primary windings 139, 140, 141 and 142 and a single secondary winding 143. The four different trains of uni-directional pulsations of different phase are caused to pass through windings 139, 140, 141 and 143 in the same direction. It will thus be apparent that a uni-directional pulsating current having a wave form which is the combination of four half cycles 90° out of phase with respect to each other is obtained in the secondary winding 143. The uni-directional current obtained in the secondary winding 143 may be smoothed out and freed of ripples in any of the well known manners such as with the use of condensors or reactances (not shown).

Due to the fact that the three phase take-off indicated generally at 131 and the D. C. take-off indicated generally at 138 is obtained through one or more static transformers, it is clear that by suitably selecting the relative number of turns of the secondary winding with respect to the primary winding, any desired reduction in voltage may be obtained.

By way of further illustration, a plurality of additional take-offs are illustrated by conductors 144. Reading from left to right, the first two conductors represent a half wave take-off from main conductors 47 and 51, the second pair represent a take-off from main conductors 46 and 50, the third pair represent a take-off from main conductors 45 and 49, and the fourth pair represent a take-off from main conductors 44 and 48. These half wave take-off or uni-directional pulsations of different phase sequence may be combined in any manner desired to obtain either single phase or polyphase alternating current, or pulsating uni-directional current.

By virtue of the fact that rectifying devices are provided at the head of each out-going conductor 44, 45, 46 and 47 and by virtue of the fact that rectifying devices are provided at the beginning of each return conducting path 48, 49, 50 and 51, it is clear that stray and parasitic currents are substantially eliminated from the transmission line. Furthermore, it will be understood by those skilled in the art that by virtue of the arrangement set forth and described that more than one source of electric energy may be connected to the distribution network 7, this is primarily by virtue of the fact that the wave form of each half cycle of alternating current is substantially identical with the wave form of the uni-directional pulsation traveling over the transmission line.

It will also be understood by those skilled in the art that the power transmission and distribution system described above is substantially self-equalizing. This is by reason of the fact that transformers 75 to 82 inclusive, are all connected to a common bus 11 which brings about an energy feedback due to a potential difference whenever an excessive load is placed on some one portion of the transmission line, such for example as might be placed on it by the application of a very heavy load at 131. This is extraordinarily advantageous in a commercial installation, not only because of its normal load equalizing effect, but also because either a direct short circuit or an open circuit in some part of the transmission line will not prevent operation of the system, nor of the power take-off network.

It will also be apparent to those skilled in the art, that this system is peculiarly well suited for handling a fluctuating load. It is also to be understood that in the case of alternating current power take-off from the main transmission line, the use of low power factor equipment on the local distribution network will not react detrimentally to the main transmission line as is the usual case for the wattless component will not be reflected out of the local distribution network, but will be confined therein and will thus only affect the local equipment which is directly connected to the local distribution network.

In Figure 2, a transmission and distribution system is illustrated schematically wherein the source of electric energy is a four wire three phase power supply 150. The power is transmitted in a manner similar to that described in connection with the description of Figure 1 over a twelve wire transmission line indicated generally as 151. The distribution network 152 is a four wire three phase distribution network.

Where a three phase alternating current source is employed to obtain power for transmitting high tension unidirectional current over a multi-conductor transmission line, six rectifying devices of the "mercury vapor tube rectifier" type are preferably employed at the transmitting end and six similar rectifiers 159, 160, 161, 162, 163 and 164 are employed at the receiving end or the distribution end of the transmission line. Each rectifier is provided with six anodes 165, 166, 167, 168, 169 and 170. Six three phase transformers 171, 172, 173, 174, 175 and 176 are connected to the four wire three phase alternating current supply line 150. Each three phase transformer is provided with three primary windings 177, 178 and 179 which are connected between the neutral wire and the respective phase wires of the three phase alternating current supply line 150. Each transformer is also provided with six secondary windings 180 to 185 inclusive, one end of each secondary winding being connected to its associated rectifier in the manner shown in the drawings.

The transmission line 151 comprises six outgoing conductors 186 to 191 inclusive which carry uni-directional pulsations in one direction and six return conductors 192 to 197 inclusive which carry uni-directional pulsations in the opposite direction.

The receiving or distribution end of the transmission line 151 has connected thereto six three phase transformers 198 to 203 inclusive which are similar in construction to transformers 171 to 176 inclusive. Each of transformers 198 to 203 is provided with three secondary windings 204, 205 and 206 and six primary windings 207, 208, 209, 210, 211 and 212. The upper side of each winding 204, 205 and 206 is connected to the grounded neutral of the four wire three phase alternating current distribution system while the lower side of windings 204, 205 and 206 are connected respectively to the other three wires of the distribution system.

It will readily be understood from the connections shown in the drawings that each rectifying device 153 to 158 inclusive impresses on its outgoing conductor 186 to 191 respectively, the conductors being connected to the cathode of each rectifying device, six trains of uni-directional pulsation or half wave, substantially 60 electrical degrees apart in phase sequence. Windings 207 to 212 of each of transformers 198 to 203 are so connected with the out-going conductors 186 to 191 and the return conductors 192 to 197 inclusive, that the six different wave trains or waves of uni-directional pulsations are selectively segregated and return over different return conductors. This is accomplished in precisely the same manner as the selective segregation process of Figure 1. It will thus be understood, that while each out-going conductor 186 to 191 and each return conductor 192 to 197 carry a plurality of unidirectional pulsations of different phase sequence, nevertheless any one out-going conductor and taken with any one return conductor represents only a single closed circuit. Thus the uni-directional pulsations derived from secondary winding 180 of transformer 171 pass out over out-going conductor 186 through primary winding 207 and back through return conductor 192 to the opposite side of winding 180 of transformer 171. Similarly the closed circuit of winding 181 of transformer 171 includes out-going conductor 186, winding 208 of transformer 203 and return conductor 197. The closed circuit of winding 182 of transformer 171 includes out-going conductor 186, winding 209 of transformer 199 and return conductor 193. The closed circuit winding 183 of transformer 171 includes out-going conductor 186, primary winding 210 of transformer 202 and return conductor 196. The closed circuit of winding 184 of transformer 171 includes out-going conductor 186, winding 211 of transformer 200 and return conductor 194. The closed circuit of winding 185 of transformer 171 includes out-going conductor 186, winding 212 of transformer 201 and return conductor 195. It will thus be seen that the uni-directional pulsations traveling out over out-going conductor 186 are selectively segregated and return over return conductors 192, 193, 194, 195, 196 and 197. The closed circuit paths of windings 180 to 185 of transformers 172 to 176 may be traced out in a similar manner.

By virtue of the fact that there is a separate closed circuit for each phase of uni-directional pulsations, it is possible to derive either single or polyphase alternating current or pulsating uni-directional current anywhere along the transmission line through a step-down transformer as described in connection with Figure 1 of the drawings. A three phase take-off is indicated generally at 213 and a three wire direct current take-off is indicated generally at 214.

From the above description it will be readily understood that I have provided an extraordinarily simple and effective means for transmitting large amounts of power over high tension uni-directional current transmission lines, and that by selective segregation and return of the polyphase pulsating uni-directional current transmitted over each outgoing conductor, it is possible to obtain full or reduced voltage single phase or polyphase alternating current or full or low voltage uni-directional current which has been obtained through static transforming means. It is of course to be understood that the drawings are diagrammatic only. For example, it will be appreciated by those skilled in the art that separate iron cores should be employed for each pair of secondary windings at the transmitting end of the system and also for each pair of primary windings at the receiving end or at the power take-off points of the system.

While I have shown particular embodiments of my invention, it will, of course, be understood that I do not wish to be limited thereto since many modifications may be made, and I therefore contemplate by the appended claims to cover all such modifications as fall within the true spirit and scope of my invention.

I claim as my invention:

1. A power transmission system comprising a source of polyphase alternating current, full wave rectification means connected thereto for converting the polyphase alternating current derived from said source into polyphase pulsating uni-directional current, a plurality of conducting paths forming a transmission line connected to said means, and a load circuit connected to said transmission line, said connections being such as to segregate the pulsations of different time sequences traveling out over each outgoing path of said transmission line and to return them over a plurality of different conducting paths of said transmission line.

2. A power transmission system comprising a source of polyphase alternating current, full wave rectification means connected thereto for converting the polyphase alternating current derived from said source into polyphase pulsating uni-directional current, a plurality of interconnected closed circuits forming a transmission line connected to said means, and a load connected to said circuits, said circuits having impressed thereon uni-directional pulsations of different time sequence, no two pulsations of different time sequence being common to any one complete closed circuit.

3. A power transmission system comprising a source of polyphase alternating current, full wave rectification means connected thereto for converting the polyphase alternating current derived from said source into polyphase pulsating uni-directional current, a plurality of conducting paths for carrying said polyphase pulsating uni-directional current in one direction and a plurality of conducting paths for carrying said polyphase pulsating uni-directional current in the opposite direction, said conducting paths forming a transmission line, and means for selectively segregating uni-directional pulsations of different phase on one of said first conducting paths and causing them to return over different second conducting paths.

4. A power transmission system comprising a source of polyphase alternating current, a plurality of electron discharge rectifiers each having a plurality of anodes and a cathode, a transmission line having a plurality of pairs of conductors, each of said pairs of conductors including an outgoing conductor for carrying uni-directional current in one direction and a return conductor for carrying uni-directional current in the opposite direction, the transmission ends of said outgoing conductors being each connected to a cathode of one of said rectifiers, respectively, the anodes of said rectifiers being connected to said source through means arranged to impress polyphase uni-directional pulsating current on each of said outgoing conductors, means at the receiving end of said transmission line for selectively segregating uni-directional pulsations of different phase arriving at the receiving end of each of said outgoing conductors and causing said pulsations of different phase to return over different return conductors, said return conductors being connected to said source in a manner to provide a plurality of closed paths with said outgoing conductors, any one outgoing conductor taken with any one return conductor providing a single and only a single closed circuit.

5. A power transmission system comprising a source of polyphase alternating current, full wave rectification means connected thereto for converting the polyphase alternating current derived from said source into polyphase pulsating uni-directional current, a plurality of conducting paths including outgoing conductors and return conductors forming a transmission line connected to said means, and means connected to said transmission line at the point remote from said first means for selectively segregating pulsations of different phase and causing them to return over different return conductors.

6. A power transmission system comprising a source of polyphase alternating current, full wave rectification means connected thereto for converting the polyphase alternating current derived from said source into polyphase pulsating uni-directional current, a plurality of conducting paths including outgoing conductors and return conductors forming a transmission line connected to said means, means connected to said transmission line at a point remote from said first means for selectively segregating pulsations of different phase and causing them to return over different return conductors, a local distribution network, and means for inductively coupling said local distribution network to said transmission line.

7. A power transmission system comprising a source of polyphase alternating current, full wave rectification means connected thereto for converting the polyphase pulsating uni-directional current, a plurality of conducting paths including outgoing conductors and return conductors forming a transmission line connected to said means, a local alternating current distribution network, and means for inductively coupling said local distribution network to said transmission line.

8. A power transmission system comprising a source of polyphase alternating current, full wave rectification means connected thereto for converting the polyphase alternating current derived from said source into polyphase pulsating uni-directional current, a plurality of conducting paths including outgoing conductors and return conductors forming a transmission line connected to said means, means connected to said transmission line at a point remote from said first means for selectively segregating pulsations of different phase and causing them to return over different return conductors, a local distribution network, and static means for connecting said network to said transmission line in such a manner that alternating current power is transmitted over said local distribution network of the same frequency as said source.

9. A power transmission system comprising a source of polyphase alternating current, full wave rectification means connected thereto for converting the polyphase alternating current derived from said source into polyphase pulsating uni-directional current, a plurality of conducting paths including outgoing conductors and return conductors forming a transmission line connected to said means, means connected to said transmission line at a point remote from said first means for selectively segregating pulsations of different phase and causing them to return over different return conductors, a local distribution network, and static means for connecting said network to said transmission line in such a manner that alternating current power of a different number of phases but of the same frequency as said source is transmitted over said local distribution network.

10. The method of transmitting polyphase pulsating uni-directional current over a multiconductor transmission line which includes transmitting electric energy over one of said conductors in the form of a plurality of half waves of different time phase with respect to each other, selectively segregating half waves of different time phase and returning them over different conductors of said transmission line.

11. A power transmission system connecting a principal distribution network to a principal polyphase supply main, a group of static transformers connected to said distribution network and a second group of static transformers connected to said supply main, and a transmission line including a plurality of outgoing conductors and a plurality of return conductors connecting said groups of transformers together, said connections being such that a plurality of closed circuits are formed and so arranged that any one outgoing conductor and any one return conductor are common to only a single closed path.

12. A power transmission system comprising a source of two phase alternating current, full wave rectification means connected thereto for converting the two phase alternating current derived from said source into pulsating uni-directional current in the form of wave trains each train having four half waves of the same potential but out of phase 90° with respect to each other, a plurality of conducting paths including four outgoing conductors and four return conductors forming a transmission line connected to said means, a load circuit connected to said transmission line at a point remote from said first means for selectively seggregating the half waves of different phase and causing them to return over different return conductors, and means connected to said load circuit for supplying three phase power to a distribution network.

13. A power transmission system comprising a source of polyphase alternating current, a plurality of electron discharge rectifiers each having a plurality of anodes and a cathode, a transmission line having a plurality of pairs of conductors, each of said pairs of conductors including an outgoing conductor for carrying unidirectional current in one direction and a return conductor for carrying uni-directional current in the opposite direction, the transmission ends of said outgoing conductors being each connected to a cathode of one of said rectifiers, respectively, the anodes of said rectifiers being connected to said source through means arranged to impress polyphase uni-directional pulsating current on each of said outgoing conductors, means at the receiving end of said transmission line for selectively segregating uni-directional pulsations of different phase arriving at the receiving end of each of said outgoing conductors, a plurality of electron discharge rectifiers each having a plurality of anodes and a cathode disposed at the receiving end of said transmission line, the cathode of each of said last named rectifiers being connected to a return conductor and the anodes of said last named rectifiers being connected to said segregating means in such a manner that pulsations of different phase traveling out over any one outgoing conductor return over different return conductors, said return conductors being connected to said source in a manner to provide a plurality of closed paths with said outgoing conductors, any one outgoing conductor taken with any one return conductor providing a single and only a single closed circuit.

14. A transmission system adapted for the transmission of polyphase pulsating uni-directional current over a multi-conductor transmission line, comprising a first plurality of rectifiers connected to one point of the transmission system with each rectifier having a plurality of anodes and a cathode, a first polyphase alternating current system connected with said first plurality of rectifiers, a second plurality of rectifiers connected to another point of the transmission system with each rectifier having a plurality of anodes and a cathode, a second polyphase alternating current system connected with said second plurality of rectifiers, a plurality of pairs of conductors connecting said first and said second pluralities of rectifiers, with each of said pairs of conductors consisting of an outgoing line connected to a cathode of a rectifier of said first plurality of rectifiers and of a return line connected to a cathode of a rectifier of said second plurality of rectifiers, respectively, and means in circuit association with said first and said second pluralities of rectifiers to segregate uni-directional current impulses of differing phase relation carried by said pairs of conductors so that pulsations of different phase travelling over any one outgoing conductor return over a plurality of return conductors whereby a selected outgoing conductor and a selected return conductor form a single closed path for a selected impulse in a certain phase relation.

ALBERT R. LOCKE.